United States Patent
Roock et al.

(10) Patent No.: US 9,896,609 B2
(45) Date of Patent: *Feb. 20, 2018

(54) TWO COMPONENT POLYURETHANE COMPOSITION

(71) Applicant: SIKA TECHNOLOGY AG, Baar (CH)

(72) Inventors: Wolfgang Roock, Appen (DE); Steffen Kelch, Oberengstringen (CH); Matthias Heidtmann, Lubeck (DE)

(73) Assignee: SIKA TECHNOLOGY AG, Baar (CH)

(*) Notice: Subject to any disclaimer, the term of this patent is extended or adjusted under 35 U.S.C. 154(b) by 0 days.

This patent is subject to a terminal disclaimer.

(21) Appl. No.: 14/785,098

(22) PCT Filed: May 14, 2014

(86) PCT No.: PCT/EP2014/059885
§ 371 (c)(1),
(2) Date: Oct. 16, 2015

(87) PCT Pub. No.: WO2014/184264
PCT Pub. Date: Nov. 20, 2014

(65) Prior Publication Data
US 2016/0068724 A1 Mar. 10, 2016

(30) Foreign Application Priority Data
May 15, 2013 (EP) .................................... 13167913

(51) Int. Cl.
| | |
|---|---|
| *C08G 18/32* | (2006.01) |
| *C09J 175/00* | (2006.01) |
| *C09J 175/14* | (2006.01) |
| *C08G 18/65* | (2006.01) |
| *C08G 18/69* | (2006.01) |
| *C09J 175/04* | (2006.01) |
| *B32B 7/12* | (2006.01) |
| *C09D 175/14* | (2006.01) |

(52) U.S. Cl.
CPC .............. *C09J 175/14* (2013.01); *B32B 7/12* (2013.01); *C08G 18/3206* (2013.01); *C08G 18/3215* (2013.01); *C08G 18/6588* (2013.01); *C08G 18/69* (2013.01); *C09D 175/14* (2013.01); *C09J 175/04* (2013.01); *B32B 2250/02* (2013.01); *B32B 2255/26* (2013.01)

(58) Field of Classification Search
CPC ... C09J 175/14; C09J 175/04; C08G 18/3206; C08G 18/3215; C08G 18/6588; C08G 18/69; C09D 175/14; B32B 7/12; B32B 2250/02; B32B 2255/26
See application file for complete search history.

(56) References Cited

U.S. PATENT DOCUMENTS

| | | | |
|---|---|---|---|
| 2007/0249778 A1* | 10/2007 | Clemens | ................ C08G 18/10 524/502 |
| 2009/0214873 A1* | 8/2009 | Demmig | ............ C08G 18/3215 428/423.1 |
| 2009/0260754 A1 | 10/2009 | Te Poel | |

FOREIGN PATENT DOCUMENTS

| | | | |
|---|---|---|---|
| CN | 101151290 A | 3/2008 | |
| CN | 102272184 A | 12/2011 | |
| EP | 1 690 880 A1 | 8/2006 | |
| FR | 2938267 * | 5/2010 | ............ C08G 18/10 |
| WO | WO 2008/052841 A1 | 5/2008 | |
| WO | 2009/094905 A1 | 8/2009 | |

OTHER PUBLICATIONS

FR-2938267: Machine Translation.*
International Preliminary Report of Patentability (Form PCT/IB/373) and an English translation of the Written Opinion of the International Searching Authority (Form PCT/IB/237) dated Nov. 26, 2015, issued in corresponding International Application No. PCT/EP2014/059885 (6 pgs).
International Search Report (PCT/ISA/210) dated Jul. 7, 2014, by the European Patent Office as the International Searching Authority for International Application No. PCT/EP2014/059885.
Written Opinion (PCT/ISA/237) dated Jul. 7, 2014, by the European Patent Office as the International Searching Authority for International Application No. PCT/EP2014/059885.
Jun. 27, 2017 Notification of First Office Action issued in Chinese Application No. 201480022824.7.

* cited by examiner

*Primary Examiner* — Michael L Leonard
(74) *Attorney, Agent, or Firm* — Oliff PLC

(57) ABSTRACT

The present invention relates to a polyurethane composition consisting of a first and a second component, wherein the first component comprises an alkoxylated aromatic diol, a low molecular weight aliphatic or cycloaliphatic diol and a specific polybutadiene polyol in specific ratios. The cured composition is characterized by having good adhesive characteristics, a strength that is only slightly dependent upon the temperature in the temperature range of −35 to +85° C. and high strength and elasticity. It is particularly suitable as a structural adhesive for bonding two substrates.

27 Claims, No Drawings

TWO COMPONENT POLYURETHANE COMPOSITION

FIELD OF TECHNOLOGY

The invention relates to the field of two-component polyurethane compositions and the use thereof, especially as an adhesive or as a jointing compound.

PRIOR ART

Two-component polyurethane adhesives based on polyols and polyisocyanates have already long been used. Two-component polyurethane adhesives have the advantage that they cure rapidly after mixing and therefore can absorb and transmit relatively high forces after only a short time. For use as structural adhesives, high demands in terms of strength and adhesive force are made on adhesives, since such adhesives are elements of load-bearing structures.

A desire especially exists for adhesives that have high strengths in the sense of structural bonds and nevertheless have high extensibility over the largest possible temperature range, combined with a less pronounced dependence of the strength on the temperature. Also desired are adhesives that exhibit good adhesion to metal substrates and can be cured to final strength at ambient temperature or also in a heat-accelerated curing process.

PRESENTATION OF THE INVENTION

Therefore, the object of the present invention is to provide a two-component polyurethane composition which has high strength and extensibility with only a slight dependence of the mechanical characteristics on the temperature and has good bonding characteristics on metal substrates.

Surprisingly, this object is achieved with the polyurethane composition according to the invention. On one hand, it has a high polybutadiene polyol content. It also contains at least one alkoxylated aromatic diol and at least one low molecular weight aliphatic or cycloaliphatic diol in specific proportions. Surprisingly, it was found that this composition has high strength and elasticity, only a slight dependence of the mechanical characteristics on the temperature, and very good adhesive characteristics on metal substrates. This is especially apparent from the high values for tensile shear strength in the temperature range of −35 to 85° C. In addition, the composition is especially resistant to moisture.

Additional aspects of the invention are the subject matter of further independent claims. Particularly preferred embodiments of the invention are the subject matter of the dependent claims.

METHODS OF EXECUTING THE INVENTION

The present invention relates to a polyurethane composition consisting of a first and a second component; wherein
the first component comprises
  at least one alkoxylated aromatic diol A1 with an average molar mass in the range of 300 to 1000 g/mol,
  at least one aliphatic or cycloaliphatic diol A2 with a molar mass in the range of 90 to 200 g/mol, which is not a linear alkylene diol with two primary OH groups,
  at least one polybutadiene polyol A3 with an average OH functionality in the range of 2.1 to 2.9, especially 2.3 to 2.7, and with an average molar mass in the range of 2000 to 4000 g/mol, especially 2500 to 3000 g/mol, and
the second component comprises
  at least one polyisocyanate;
wherein the diol A1, the diol A2 and the polybutadiene polyol A3 are present in a quantity such that
  the weight ratio A1/A2 falls in the range of 0.1 to 1, preferably 0.2 to 0.7, especially 0.3 to 0.7,
  the weight ratio A3/(A1+A2) falls in the range of 3 to 9, preferably 4 to 8, especially 5 to 8, and
  the fraction of polybutadiene polyol A3 relative to all polyols present in the first component falls in the range of 50 to 90 wt.-%, preferably 65 to 90 wt.-%, especially 75 to 90 wt.-%.

The prefix "poly" in substance names such as "polyol", "polyisocyanate", "polyether" or "polyamine" in the present document means that the respective substance formally contains more than one of the functional group present in its name per molecule.

"Molar mass" is defined in the present document as the molar mass (in grams per mole) of a molecule. The "average molar mass" is the term used for the average molar mass $M_n$ of an oligomeric or polymeric mixture of molecules, which is usually determined by GPC against polystyrene as standard.

"Primary hydroxyl group" is the term applied to an OH group bonded to a C-Atom with two hydrogens.

"Open time" is the term used in this document for the time within which the parts to be bonded must be fitted together after the components are mixed.

The term "strength" in the present document refers to the strength of the cured adhesive, wherein strength especially refers to the tensile strength and the modulus of elasticity (E-modulus), especially in the elongation range of 0.05 to 0.25%.

"Room temperature" in the present document means a temperature of 23° C.

The first component of the composition comprises at least one alkoxylated aromatic diol A1 with an average molar mass in the range of 300 to 1000 g/mol.

The alkoxylated aromatic diol A1 is especially a polyether diol with an aromatic fraction, such as can be obtained especially by alkoxylation of an aromatic diol with two phenolic OH groups.

Preferably, the alkoxylated aromatic diol A1 is an ethoxylated and/or propoxylated and/or butoxylated aromatic diol, especially an ethoxylated and/or propoxylated aromatic diol. These diols are particularly readily accessible.

Particularly preferably, the alkoxylated aromatic diol A1 is a propoxylated aromatic diol. These diols yield readily processable adhesives with good adhesive characteristics in the cured state.

The aromatic fraction of the alkoxylated aromatic diol A1 is preferably a benzene radical, naphthalene radical, diphenylmethane radical, 1,1-diphenylethane radical, 2,2-diphenylpropane radical, diphenyl ether radical, benzophenone radical, bis(phenyl)sulfone radical or biphenyl radical.

Preferred among these are the diphenylmethane radical and the 2,2-diphenylpropane radical. These aromatic radicals are derived from bisphenol F or bisphenol A. Such alkylated aromatic diols A1 yield easily processed compositions with particularly high strengths.

Particularly preferably, the alkoxylated aromatic diol A1 is a propoxylated bisphenol A or a propoxylated bisphenol F, especially a propoxylated bisphenol A. Compositions with particularly good adhesive characteristics are obtained with these.

The alkoxylated aromatic diol A1 preferably has an average molar mass in the range of 350 to 500 g/mol. These diols A1 allow for particularly high strengths.

The first component of the composition additionally comprises at least one aliphatic or cycloaliphatic diol A2 with a molar mass in the range of 90 to 200 g/mol which is not a linear alkylene diol with two primary OH groups. Thus, the diol A2, for example, is not 1,4-butanediol or 1,5-pentanediol. Compositions with inadequate tensile shear strengths and tensile strengths at room temperature and higher temperatures are obtained with such linear diols.

Preferred as the diol A2 are branched alkylene diols, alkylene diols with one primary and one secondary hydroxyl group and cycloaliphatic diols.

Preferred is the diol A2 selected from the group consisting of 1,3-butanediol, 2,3-butanediol, 2-methyl-1,3-propanediol, 1,2-pentanediol, 2,4-pentanediol, 2-methyl-1,4-butanediol, 2,2-dimethyl-1,3-propanediol (neopentyl glycol), 1,2-hexanediol, 3-methyl-1,5-pentanediol, 1,2-octanediol, 3,6-octanediol, 2-ethyl-1,3-hexanediol, 2,2,4-trimethyl-1,3-pentanediol, 2-butyl-2-ethyl-1,3-propanediol, 2,7-dimethyl-3,6-octanediol, 1,4-cyclohexanediol, 1,3-cyclohexane dimethanol and 1,4-cyclohexane dimethanol.

Preferred among these are 1,2-butanediol, 1,3-butanediol, 1,2-pentanediol, 2-methyl-1,4-butanediol, 2,2-dimethyl-1,3-propanediol (neopentyl glycol), 3-methyl-1,5-pentanediol, 1,2-hexanediol, 1,2-octanediol, 3,6-octanediol and 2-ethyl-1,3-hexanediol.

Most preferred as the diol A2 is 2-ethyl-1,3-hexanediol. This diol enables compositions to be made which have especially high values for the tensile strength at high temperatures during curing.

The first component of the composition also comprises at least one polybutadiene polyol A3 with an average OH functionality in the range of 2.1 to 2.9, especially 2.3 to 2.7, and an average molar mass in the range of 2000 to 4000 g/mol, especially 2500 to 3000 g/mol.

Such polybutadiene polyols are especially obtainable by the polymerization of 1,3-butadiene and allyl alcohol in a suitable proportion or by the oxidation of suitable polybutadienes.

Suitable polybutadiene polyols are especially polybutadiene polyols containing structural elements of formula (I) and optionally structural elements of formulas (II) and (III).

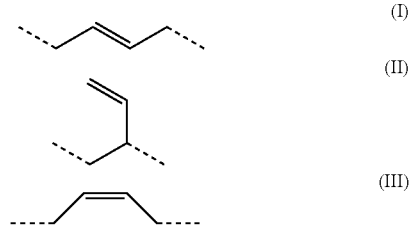

Preferred polybutadiene polyols contain 40 to 80%, especially 55 to 65% of the structural element of formula (I), 0 to 30%, especially 15 to 25%, of the structural element of formula (II), 0 to 30%, especially 15 to 25%, of the structural element of formula (III).

Particularly suitable polybutadiene polyols are, for example, available form Cray Valley under the trade names Poly Bd® R-45HTLO or Poly Bd® R-45M.

Such polybutadiene polyols together with the diols A1 and A2 promote the formation of cured compositions with strength that is largely independent of the temperature.

The diol A1 and the diol A2 are present in the composition in a quantity such that the weight ratio A1/A2 is in the range of 0.1 to 1, preferably 0.2 to 0.7, especially 0.3 to 0.7. In this range the composition has very good adhesive characteristics at high strength.

In addition, the diol A1, the diol A2 and the polybutadiene polyol A3 are present in the composition in a quantity such that the weight ratio A3/(A1+A2) is in the range of 3 to 9, preferably 4 to 8, especially 5 to 8. In this range, the composition has a high strength and a high extensibility with good elasticity.

In addition, the fraction of polybutadiene polyol A3 relative to all polyols present in the first component is in the range of 50 to 90 wt.-%, preferably 65 to 90 wt.-%, especially 75 to 90 wt.-%. This means that the composition contains a very large fraction of polybutadiene polyol A3, even if additional polyols are present besides the diols A1 and A2 and the polybutadiene polyol A3. The high content of polybutadiene polyol A3 guarantees the desired temperature-independent mechanical characteristics and the high moisture resistance of the composition described.

In one embodiment of the invention the first component may also comprise a monoalcohol A4 with a molar mass in the range of 140 to 340 g/mol, which especially contains at least one ether group, wherein the monoalcohol A4 is present in a quantity such that the weight ratio A4/(A1+A2) is in the range of 0.1 to 0.5, preferably 0.2 to 0.4. The monoalcohol can especially improve the processability of the composition and the temperature independence of the tensile shear strength.

Especially suitable as the monoalcohol A4 are alkoxylated derivatives of phenol, especially ethoxylated or propoxylated phenol. Particularly suitable as the monoalcohol A4 is 1-phenoxy-2-propanol. Such a monoalcohol can reduce the viscosity of the first component particularly well, which can be advantageous for the processability of the composition, and it can improve the elastic characteristics in the cold.

In one embodiment of the invention, the composition is free from monoalcohol A4. A composition of this type has a particularly high strength at high temperatures and a particularly temperature-independent modulus of elasticity.

The second component of the composition comprises at least one polyisocyanate. Suitable polyisocyanates are especially monomeric di- or triisocyanates, as well as oligomers, polymers and derivatives of the monomeric di- or triisocyanates, as well as arbitrary mixtures thereof.

Suitable aromatic monomeric di- or triisocyanates are especially 2,4- and 2,6-toluene diisocyanate and arbitrary mixtures of these isomers (TDI), 4,4'-, 2,4'- and 2,2'-diphenylmethane diisocyanate and arbitrary mixtures of these isomers (MDI), mixtures of MDI and MDI homologs (polymeric MDI or PMDI), 1,3- and 1,4-phenylene diisocyanate, 2,3,5,6-tetramethyl-1,4-diisocyanatobenzene, naphthalene-1,5-diisocyanate (NDI), 3,3'-dimethyl-4,4'-diisocyanatodiphenyl (TODD, dianisidine diisocyanate (DADI), 1,3,5-tris-(isocyanatomethyl)benzene, tris-(4-isocyanatophenyl)methane and tris-(4-isocyanatophenyl)thiophosphate.

Suitable aliphatic monomeric di- or triisocyanates are especially 1,4-tetramethylene diisocyanate, 2-methylpentamethylene-1,5-diisocyanate, 1,6-hexamethylene diisocyanate (HDI), 2,2,4- and 2,4,4-trimethyl-1,6-hexamethylene diisocyanate (TMDI), 1,10-decamethylene diisocyanate, 1,12-dodecamethylene diisocyanate, lysine and lysine ester diisocyanate, cyclohexane-1,3- and -1,4-diisocyanate, 1-methyl-2,4- and -2,6-diisocyanatocyclohexane and arbitrary mixtures of these isomers (HTDI or H$_6$TDI), isocyanato-3,3,5-trimethyl-5-isocyanatomethyl_cyclohexane (=isophorone diisocyanate or IPDI), perhydro-2,4'- and -4,4'-diphenylmethane diisocyanate (HMDI or H$_{12}$MDI), 1,4-diisocyanato-2,2,6-trimethylcyclohexane (TMCDI), 1,3- and 1,4-bis-(isocyanatomethyl) cyclohexane, m- and p-xylylene diisocyanate (m- and p-XDI), m- and p-tetramethyl-1,3- and -1,4-xylylene diisocyanate (m- and p-TMXDI), bis-(1-isocyanato-1-methylethyl)naphthalene, dimer and trimer fatty acid isocyanates such as 3,6-bis-(9-isocyanatononyl)-4,5-di-(1-heptenyl)cyclohexene (dimeryl diisocyanate) and α,α,α',α',α",α"-hexamethyl-1,3,5-mesitylene triisocyanate.

Preferred among these are MDI, TDI, HDI and IPDI.

Suitable oligomers, polymers and derivatives of the monomeric di- and triisocyanates are especially derived from MDI, TDI, HDI and IPDI. Especially suitable among these are commercially available types, especially HDI-biurets such as Desmodur® N 100 and N 3200 (from Bayer), Tolonate® HDB and HDB-LV (from Rhodia) and Duranate® 24A-100 (from Asahi Kasei); HDI isocyanurates, such as Desmodur® N 3300, N 3600 and N 3790 BA (all from Bayer), Tolonate® HDT, HDT-LV and HDT-LV2 (from Rhodia), Duranate® TPA-100 and THA-100 (from Asahi Kasei) and Coronate® HX (from Nippon Polyurethane); HDI-uretidiones such as Desmodur® N 3400 (from Bayer); HDI-iminooxadiazine diones such as Desmodur® XP 2410 (from Bayer); HDI-allophanates such as Desmodur® VP LS 2102 (from Bayer); IPDI-isocyanurates, for example in solution as Desmodur® Z 4470 (from Bayer) or in solid form as Vestanat® T1890/100 (from Degussa); TDI oligomers such as Desmodur® IL (from Bayer); as well as mixed isocyanurates based on TDI/HDI, for example as Desmodur® HL (from Bayer). Also especially suitable are forms of MDI that are liquid at room temperature (so-called "modified MDI"), which represent mixtures of MDI with MDI derivatives, especially MDI carbodiimides or MDI uretoneimines or MDI urethanes, known under trade names such as Desmodur® CD, Desmodur® PF, Desmodur® PC (all from Bayer) or Isonate® M 143 (from Dow), as well as mixtures of MDI and MDI homologs (polymeric MDI or PMDI), available under trade names such as Desmodur® VL, Desmodur® VL50, Desmodur® VL R10, Desmodur® VL R20, Desmodur® VH 20 N and Desmodur® VKS 20F (all from Bayer), Isonate® M 309, Voranate® M 229 and Voranate® M 580 (all from Dow) or Lupranat® M 10 R (from BASF). The above-named oligomeric polyisocyanates in practice are usually mixtures of substances with different degrees of oligomerization and/or chemical structures. Preferably they have a mean NCO functionality of 2.1 to 4.0.

Preferably the polyisocyanate is selected from the group consisting of MDI, TDI, HDI and IPDI and oligomers, polymers and derivatives of the isocyanates mentioned, as well as mixtures thereof.

Preferably the polyisocyanate contains isocyanurate, iminooxadiazine dione, uretdione, biuret, allophanate, carbodiimide, uretoneimine or oxadiazinetrione groups.

Particularly preferred as the polyisocyanate are forms of MDI that are liquid at room temperature. These are especially so-called polymeric MDI as well as MDI with fractions of oligomers or derivatives thereof. The MDI (=4,4'-, 2,4'- or 2,2'-diphenylmethane diisocyanate and arbitrary mixtures of these isomers) contents of such liquid forms of MDI amounts, in particular, to 50 to 95 wt.-%, especially 60 to 90 wt.-%.

Particularly preferred as the polyisocyanate are polymeric MDI and MDI types that are liquid at room temperature, which contain fractions of MDI-carbodiimides or adducts thereof.

Particularly good processing characteristics and particularly high strengths are obtained with these polyisocyanates.

The polyisocyanate of the second component can have fractions of isocyanate group-containing polyurethane polymers. Either the second component can comprise a separately prepared isocyanate group-containing polyurethane polymer, or the polyisocyanate was mixed with at least one polyol, especially a polyether polyol, wherein the isocyanate groups are present in a large stoichiometric excess relative to the OH groups.

Preferably, the second component has only a small fraction of isocyanate group-containing polyurethane polymers, preferably not more than 30 wt.-%, particularly preferably not more than 20 wt.-%, especially not more than 10 wt.-%, based on the total of polyisocyanate and isocyanate group-containing polyurethane polymers.

Most preferably, the second component does not contain any polyurethane polymer with isocyanate groups. A second component of this type is particularly of low viscosity, which allows for good processability of the composition, and it makes possible compositions with particularly high strengths.

The polyurethane composition may also contain, as a constituent of the first component, additional substances reactive with isocyanate groups.

Preferably, the first component contains no polyester polyols. Fractions of polyester polyols typically cause marked embrittlement of the cured composition in the cold, which is highly undesirable for use as a structural adhesive with the most temperature-independent mechanical behavior possible in the temperature range of −35 to 85° C.

In addition, the first component preferably contains no castor oil-based polyols. These reduce the tensile shear strength of the composition to an unwanted degree.

Furthermore the polyurethane composition can contain catalysts that accelerate the reaction of hydroxyl groups with isocyanate groups, especially tin, zinc, zirconium and bismuth organometallic catalysts, for example dibutyltin dilaurate, or tertiary amines, amidines or guanidines, for example 1,4-diazabicyclo[2.2.2]octane (DABCO) or 1,8-diazabicyclo[5.4.0]undec-7-ene (DBU). To achieve heat activation, especially the tertiary amines, amidines or guanidines may reversibly form a salt or a complex with phenol or carboxylic acids, especially phenolic or other aromatic carboxylic acids, which decomposes when the temperature is increased.

The polyurethane composition, in addition to the aforementioned constituents, can contain other constituents, such as those known to the person skilled in the art from two-component polyurethane chemistry. These may be present in only one component or in both. Additional constituents present may be, in particular, solvents, plasticizers and/or extenders, fillers such as especially carbon blacks, chalks or phyllosilicates, and also pigments, rheology modifiers, especially such as amorphous silicas, drying agents such as especially zeolites, adhesion promoters, such as especially trialkoxysilanes, stabilizers against oxidation, heat, light and UV radiation, flame-retarding substances, as well as surface-active substances, especially wetting agents and defoamers.

Preferred additional constituents are inorganic and organic fillers, especially natural, ground or precipitated calcium carbonates, which may optionally be coated with fatty acids, especially stearic acid, barite (heavy spar), talcs, silica flour, silica sand, dolomites, wollastonites, kaolins, calcined kaolins, mica (potassium-aluminum silicate), molecular sieves, aluminum oxides, aluminum hydroxides, magnesium hydroxide, silicas, including fine particulate silicas from pyrolysis processes, industrially manufactured carbon blacks, graphite, powdered metals such as aluminum, copper, iron, silver or steel, PVC powders or hollow spheres.

The addition of fillers is advantageous in that this increases the strength of the cured polyurethane composition.

Preferably, the polyurethane composition contains at least one filler selected from the group consisting of calcium carbonate, kaolin, barite, talc, powdered quartz, dolomite, wollastonite, kaolin, calcined kaolin and mica.

Additional constituents present may be, in particular, solvents, plasticizers and/or extenders, pigments, rheology modifiers, such as especially amorphous silicas, drying agents, such as especially zeolites, adhesion promoters, such as especially trialkoxysilanes, stabilizers against oxidation, heat, light and UV radiation, flame retardant substances and surface-active substances, especially wetting agents and defoamers.

A preferred polyurethane composition has a first component which contains
  30 to 90 wt.-%, especially 50 to 80 wt.-%, of the total of diol A1, diol A2 and polybutadiene polyol A3, and
  10 to 70 wt.-%, especially 20 to 40 wt.-%, fillers,
  and optionally additional constituents.

A preferred polyurethane composition has a second component which contains 90 to 100 wt.-%, especially 95 to 100 wt.-% of a form of MDI that is liquid at room temperature.

The first and the second component are advantageously formulated such that their mixing ratio in parts by weight lies in the range of 10:1 to 1:1, especially 7.5:1 to 2:1.

The mixing ratio between the two components is preferably such that the ratio between the number of isocyanate groups and the number of groups reactive toward isocyanates in the mixed polyurethane composition before curing is approximately in the range of 1.2 to 1, preferably 1.15 to 1.05.

The preparation of the two components takes place separately from one another and, at least for the second component, preferably under exclusion of moisture. Each of the two components is typically stored in its own container. The additional constituents of the polyurethane composition can be present as a constituent of the first or the second component, wherein additional constituents reactive toward isocyanate groups are preferably a constituent of the first component. A suitable container for storing the respective component is especially a drum, a hobbock, a bag, a bucket, a canister, a cartridge or a tube. Both components are stable in storage, in other words, they can be stored for several months to a year or more before use without their respective characteristics changing to an extent relevant for their use.

The two components are stored separately from one another before the composition is mixed and not mixed together until the time of use or immediately before. They are advantageously present in a package that consists of two or more separate chambers.

In an additional aspect, the invention comprises a package consisting of an outer packaging with two separate chambers, each of which contains the first component or the second component of the composition.

The mixing typically takes place using static mixers or dynamic mixers. When mixing, it is necessary to make sure that the components are mixed as homogeneously as possible. If the two components are mixed incompletely, local deviations from the advantageous mixing ratio occur, which can result in worsening of the mechanical characteristics.

Upon contact of the first component with isocyanate groups of the second component, curing by chemical reaction begins. In this process, the hydroxyl groups present and additional substances reactive toward isocyanate groups optionally present react with isocyanate groups present. Excess isocyanate groups react with moisture present. As a result of these reactions, the polyurethane composition cures to form a solid material. This process is also known as cross-linking.

Additional subject matter of the invention is thus also a cured polyurethane composition obtained from the curing of the polyurethane composition as described in the present document.

The two-component polyurethane composition described is advantageously usable as a structural adhesive or as a jointing compound.

Thus, the invention also relates to a method for bonding a first substrate with a second substrate, comprising the following steps:
  Mixing the above-described first and second components,
  Applying the mixed polyurethane composition to at least one of the substrate surfaces to be bonded,
  Fitting the substrates together within the open time,
  Curing the polyurethane composition.

In this process, the two substrates may consist of the same or different materials.

Thus, the invention also relates to a method for filling joints and gaps between two substrates, which comprises the steps of:
  Mixing the above-described first and second components,
  Applying the mixed polyurethane composition into the joint or the gap,
  Curing the polyurethane composition.

In these methods for bonding or for filling joints and gaps, especially suitable substrates are
  Glass, glass ceramic, glass mineral fiber mats;
  Metals and alloys, such as aluminum, iron, steel and nonferrous metals, as well as surface-coated metals and alloys, such as galvanized or chrome-plated metals;
  Coated and painted substrates, such as powder-coated metals or alloys and painted metal plates;
  Plastics, such as polyvinyl chloride (hard and soft PVC), acrylonitrile-butadiene-styrene copolymers (ABS), polycarbonate (PC), polyamide (PA), poly(methyl methacrylate) (PMMA), polyesters, epoxy resins, especially epoxy-based thermosets, polyurethanes (PUR), polyoxymethylene (POM), polyolefins (PO), polyethylene (PE) or polypropylene (PP), ethylene/propylene copolymers (EPM) and ethylene/propylene/diene terpolymers (EPDM), wherein the plastics may preferably be surface-treated with plasma, corona or flames;
  Fiber-reinforced plastics, such as carbon fiber reinforced plastics (CFRP), glass fiber reinforced plastics (GFRP) and sheet molding compounds (SMC);
  Wood, wooden materials bonded with resins, for example phenol, melamine or epoxy resins, resin-textile composite materials and other so-called polymer composites; and
  Concrete, mortar, tile, gypsum and natural stones such as granite, limestone and sandstone, or marble.

In these methods, one or both substrates is preferably a metal or a glass ceramic or a glass or a glass fiber reinforced plastic or a carbon fiber reinforced plastic or an epoxy-based thermoset.

The substrates may, if necessary, be pretreated before applying the composition. Such pretreatments comprise especially physical and/or chemical cleaning methods, as well as the application of an adhesion promoter, an adhesion promoter solution or a primer.

The bonding method described results in a product in which the composition bonds two substrates with one another.

This product is especially a sandwich element of lightweight design, a structure, for example a bridge, an industrial commodity or a consumer commodity, especially a window, a rotor blade for a wind-power plant or a transport means, especially a vehicle, preferably an automobile, a bus, a truck, a rail vehicle or a ship, as well as an airplane or a helicopter; or an attachment part for such a product.

The polyurethane composition described is characterized by high strength, extensibility and elasticity, which are quite constant over a broad temperature range of −35 to 85° C., and has good, largely temperature-independent, adhesion characteristics on metal substrates. Because of these characteristics, it is particularly suited as a structural adhesive for bonds that undergo stress at ambient outdoor temperatures.

Additional subject matter of the invention is thus also the use of the polyurethane composition described as a structural adhesive for bonding two substrates.

As a result of the high fraction of polybutadiene polyol A3, the cured composition is highly hydrophobic and water-repellent. This can promote a high water vapor diffusion resistance of the material. As a result, the composition is also especially suitable for bonded joints in which water vapor-sensitive components, for example electronic parts, are to be adhesively sealed in.

The polyurethane composition described is also advantageously usable as a jointing compound, especially as a jointing compound for filling gaps and joints, for repair purposes, as a ballast leveling compound or for protecting electronic parts.

The polyurethane composition is also preferably used as a jointing compound, especially as an electrical potting compound. In an additional aspect, therefore, the invention also comprises the use of a two-component polyurethane composition as a jointing compound, especially as an electrical potting compound.

Typical examples for uses of the polyurethane compositions according to the invention are found in the field of electrical potting compounds.

In an additional aspect, therefore, the invention also comprises a method for filling joints and gaps in a substrate comprising the steps:

a) Mixing the first component and the second component of a two-component polyurethane composition as described in the preceding, b) Applying the mixed polyurethane composition in the joint to be covered between two substrates or in the gap to be filled on the surface of a substrate, c) Curing the polyurethane composition in the joint or in the gap.

Particularly suitable as substrates are metal, plastic, wood, glass, ceramic and fiber plastics, especially metal and fiber-reinforced plastics.

In an additional aspect, therefore, the invention also comprises a filled product, which has been filled according to the above-described method.

EXAMPLES

Substances Used

| | |
|---|---|
| BPIP | Propoxylated bisphenol A, average molar mass approx. 400 g/mol, OH number 280 mg KOH/g (Simulsol ™ BPIP/P from Seppic) |
| TOMB | Butoxylated trimethylolpropane, average molar mass approx. 650 g/mol, OH number approx. 260 mg KOH/g (Simulsol ™ TOMB from Seppic) |
| Ethylhexanediol | 2-Ethyl-1,3-hexanediol |
| Poly bd R45 | Polybutadiene polyol with primary OH groups, OH functionality 2.4-2.6, average molar mass approx. 2800 g/mol, OH number 47.1 mg KOH/g (Poly bd ® R-45HTLO from Cray Valley) |
| Monoalcohol | 1-Phenoxypropan-2-ol |
| Poly bd R20 | Polybutadiene polyol with primary OH groups, OH functionality 2.4-2.6, average molar mass approx. 1300 g/mol, OH number approx. 101 mg KOH/g (Poly bd ® R20LM from Cray Valley) |
| Krasol | Polybutadiene diol, OH functionality approx. 1.9, average molar mass approx. 3000 g/mol, OH number approx. 36 mg KOH/g (Krasol ® LBH P-3000 from Cray Valley) |
| Polycin | Castor oil-based polyol, OH functionality 2.2, average molar mass 2610 g/mol, OH number 52 mg KOH/g (Polycin ® GR-50 from Vertellus) |
| Filler | Mineral filler (Sillitin Z 86 from Hoffmann Mineral) |
| Additives | Stabilizers against oxidation and UV light and Dibutyltin dilaurate catalyst |
| Polyisocyanate | Modified diphenylmethane diisocyanate containing MDI carbodiimide adducts, liquid at room temperature, NCOcontent 29.4 wt.-% (Isonate ® M 143 from Dow) |

Preparation of Polyurethane Compositions

For each composition, the constituents of the first component 1 listed in Table 1 in the indicated quantities (in parts by weight) were processed to form a homogeneous paste using a vacuum dissolver under exclusion of moisture and then stored. Likewise, the constituents of the second component 2 listed in Table 1 were processed and stored. Then the two components were processed for 30 seconds to form a homogenous paste using a SpeedMixer® (DAC 150 FV, Hauschild) for 30 seconds and this was tested immediately as follows:

For determining the mechanical characteristics, the adhesive was made into a dumbbell shape according to ISO 527, Part 2, 1B, and stored for 24 h at 23° C. and subsequently cured for 3 h at 80° C. After a conditioning period of 24 h at the temperature indicated in Table 2 (−35° C. or 23° C. or 85° C.) the modulus of elasticity ("E-Modulus") in the range of 0.05 to 0.25% elongation, the tensile strength and the elongation at break of the test pieces produced in this way were measured according to ISO 527 on a Zwick Z020 tensile testing machine at the respective temperature given in the table and a test speed of 50 mm/min.

For measuring the tensile shear strength, various test pieces were produced, wherein in each case the adhesive was applied 1 minute after completion of the mixing time between two KTL-painted steel plates, degreased with heptane, in a layer thickness of 2 mm and on an overlapping bonding surface area of 15×45 mm. The test pieces were stored for 24 h at 23° C. and subsequently cured for 3 h at 80° C. After a conditioning time of 24 h at the temperature indicated in Table 2 (−35° C. or 23° C. or 85° C.) the tensile shear strength was determined according to DIN EN 1465.

The Tg values (glass transition points) were determined based on DMTA measurements on disk-shape specimens (thickness 2-3 mm, diameter 10 mm), which were cured for 7 days under standard climate (23° C., 50% relative humidity), with a Mettler DMA/SDTA 861e device. The measurement conditions were: measurement in shear, 10 Hz excitation rate and heating rate of 5 K/min. The specimens were cooled to −60° C. and then heated to 200° C. while determining the complex shear modulus G* [MPa] wherein a maximum in the curve was read for the loss angle "tan δ" as the Tg value.

The results are presented in Tables 2.

The specifications A3/(A1+A2), A1/A2, and A4/(A1+A2) in Table 1 relate to the weight ratios of the diols A1, A2, polybutadiene polyol A3 and monoalcohol A4 present in the respective composition. The specification "% A3 in polyols" in Table 1 relates to the fraction of polybutadiene polyol A3 relative to all polyols present in the first component in wt.-%.

Z-1 to Z-4 are examples according to the invention. Rf.1 to Rf.6 are comparison examples.

TABLE 1

| | Examples | | | | | | | | | |
|---|---|---|---|---|---|---|---|---|---|---|
| | Z-1 | Z-2 | Z-3 | Z-4 | Rf. 1 | Rf. 2 | Rf. 3 | Rf. 4 | Rf. 5 | Rf. 6 |
| Component 1: | | | | | | | | | | |
| BPIP | 3.1 | 3.0 | 3.1 | 3.1 | 3.1 | 3.0 | — | 3.0 | 3.0 | 3.0 |
| TOMB | — | — | — | — | — | — | 3.0 | — | — | — |
| Ethylhexane diol | 5.2 | 5.0 | 7.9 | 5.0 | 5.2 | — | 5.0 | 5.0 | 5.0 | 5.0 |
| 1,4-butanediol | — | — | — | — | — | 5.0 | — | — | — | — |
| Poly bd R45 | 60.6 | 58.8 | 57.7 | 33.0 | 82.4 | 58.8 | 58.8 | — | — | — |
| Monoalcohol | — | 2.9 | — | — | — | 2.9 | 2.9 | 2.9 | 2.9 | 2.9 |
| Poly bd R20 | — | — | — | — | — | — | — | 58.8 | — | — |
| Krasol | — | — | — | — | — | — | — | — | 58.8 | — |
| Polycin | — | — | — | — | — | — | — | — | — | 58.8 |
| Filler | 30.6 | 29.8 | 30.8 | 58.4 | 8.9 | 29.9 | 29.9 | 29.8 | 29.8 | 29.8 |
| Additive | 0.5 | 0.5 | 0.5 | 0.5 | 0.5 | 0.4 | 0.4 | 0.5 | 0.5 | 0.5 |
| A3/(A1 + A2) | 7.3 | 7.4 | 5.2 | 4.1 | 9.9 | — | — | — | — | — |
| A1/A2 | 0.60 | 0.60 | 0.39 | 0.62 | 0.60 | — | — | 0.60 | 0.60 | 0.60 |
| % A3 in polyols | 88% | 88% | 84% | 80% | 91% | 88% | 88% | — | — | — |
| A4/(A1 + A2) | — | 0.36 | — | — | — | — | — | 0.36 | 0.36 | 0.36 |
| Component 2: | | | | | | | | | | |
| Polyisocyanate | 22.0 | 24.0 | 28.0 | 18.0 | 25.0 | 31.0 | 24.0 | 36.0 | 23.0 | 25.0 |

TABLE 2

| | Examples | | | | | | | | | |
|---|---|---|---|---|---|---|---|---|---|---|
| | Z-1 | Z-2 | Z-3 | Z-4 | Rf. 1 | Rf. 2 | Rf. 3 | Rf. 4 | Rf. 5 | Rf. 6 |
| Tensile shear strength [MPa] | | | | | | | | | | |
| −35° C. | 14.3 | 10.4 | 13.6 | 12.4 | 14.6 | 11.3 | 13.8 | 10.9 | 12 | 5.9 |
| 23° C. | 9.2 | 7.9 | 9.5 | 8.6 | 5.5 | 3.1 | 6.2 | 5.1 | 2.1 | 0.3 |
| 85° C. | 2.1 | 2.1 | 3.2 | 4.2 | 0.7 | 0.9 | 1.2 | 0.8 | 0.1 | n.d. |
| Tensile strength [MPa] | | | | | | | | | | |
| −35° C. | 27.9 | 24.1 | 30.3 | 31.7 | 39.3 | 21.6 | 23.9 | 36.1 | n.d. | n.d. |
| 23° C. | 10.1 | 8.4 | 13.2 | 15.6 | 8.0 | 6.4 | 10.0 | 13.5 | n.d. | n.d. |
| 85° C. | 2.6 | 1.5 | 3.8 | 7.9 | 1.6 | 2.3 | 1.4 | 2.0 | n.d. | n.d. |
| Elongation at break [%] | | | | | | | | | | |
| −35° C. | 175 | 170 | 145 | 22 | 285 | 160 | 163 | 28 | n.d. | n.d. |
| 23° C. | 220 | 320 | 175 | 38 | 275 | 165 | 270 | 170 | n.d. | n.d. |
| 85° C. | 135 | 410 | 155 | 80 | 85 | 155 | 240 | 140 | n.d. | n.d. |
| Modulus of elasticity [MPa] | | | | | | | | | | |
| −35° C. | 137 | 167 | 153 | 632 | 55 | 122 | 137 | 1014 | n.d. | n.d. |
| 23° C. | 24 | 32 | 87 | 337 | 11 | 21 | 31 | 151 | n.d. | n.d. |
| 85° C. | 4 | 1 | 5 | 46 | 3 | 5 | 1 | 2 | n.d. | n.d. |
| Tg [° C.] | −58/66 | −55/50 | −65/76 | n.d. | n.d. | −58/40/110 | −58/55 | 40 | n.d. | n.d. |

"n.d." stands for "not determined"

The invention claimed is:

1. A polyurethane composition consisting of a first and a second component; wherein
the first component comprises
at least one alkoxylated aromatic diol A1 with an average molar mass in the range of 300 to 1000 g/mol,
at least one aliphatic or cycloaliphatic diol A2 with a molar mass in the range of 90 to 200 g/mol, which is not a linear alkylene diol with two primary OH groups,
at least one polybutadiene polyol A3 with an average OH functionality in the range of 2.3 to 2.7, and with an average molar mass in the range of 2500 to 3000 g/mol, and
the second component comprises
at least one polyisocyanate;
wherein the diol A1, the diol A2 and the polybutadiene polyol A3 are present in a quantity such that
the weight ratio A1/A2 falls in the range of 0.1 to 1,
the weight ratio A3/(A1+A2) falls in the range of 3 to 9, and
the fraction of polybutadiene polyol A3, based on all polyols present in the first component, falls in the range of 50 to 90 wt.-%.

2. The polyurethane composition according to claim 1, wherein the alkoxylated aromatic diol A1 is a propoxylated bisphenol A or a propoxylated bisphenol F.

3. The polyurethane composition according to claim 1, wherein the aliphatic or cycloaliphatic diol A2 is selected from the group consisting of 1,3-butanediol, 2,3-butanediol, 2-methyl-1,3-propanediol, 1,2-pentanediol, 2,4-pentanediol, 2-methyl-1,4-butanediol, 2,2-dimethyl-1,3-propanediol, 1,2-hexanediol, 3-methyl-1,5-pentanediol, 1,2-octanediol, 3,6-octanediol, 2-ethyl-1,3-hexanediol, 2,2,4-trimethyl-1,3-pentanediol, 2-butyl-2-ethyl-1,3-propanediol, 2,7-dimethyl-3,6-octandiol, 1,4-cyclohexanediol, 1,3-cyclohexane dimethanol and 1,4-cyclohexane dimethanol.

4. The polyurethane composition according to claim 1, wherein the first component additionally comprises a monoalcohol A4 with a molar mass in the range of 140 to 340 g/mol, wherein the monoalcohol A4 is present in a quantity such that the weight ratio A4/(A1+A2) falls in the range of 0.1 to 0.5.

5. The polyurethane composition according to claim 1, wherein the polyisocyanate is a form of 4,4'-, 2,4'- or 2,2'-diphenylmethane diisocyanate liquid at room temperature and arbitrary mixtures of these isomers (MDI) in the form of polymeric MDI or MDI with fractions of oligomers or derivatives.

6. The polyurethane composition according to claim 1, wherein the second component does not contain a polyurethane polymer with isocyanate groups.

7. The polyurethane composition according to claim 1, wherein the first component contains no polyester polyols.

8. The polyurethane composition according to claim 1, wherein the first component contains no castor oil-based polyols.

9. The polyurethane composition according to claim 1, wherein the first component contains
30 to 90 wt.-% of the total of diol A1, diol A2 and polybutadiene polyol A3, and
10 to 70 wt.-% fillers,
and optionally additional constituents.

10. The polyurethane composition according to claim 1, wherein the second component contains 90 to 100 wt.-% of a form liquid at room temperature of 4,4'-, 2,4'- or 2,2'-diphenylmethane diisocyanate and arbitrary mixtures of these isomers (MDI).

11. The polyurethane composition according to claim 1, wherein the mixing ratio in parts by weight between the first and second component falls in the range of 10:1 to 1:1.

12. A method for bonding a first substrate with a second substrate, comprising the steps:
mixing the first and the second component of a polyurethane composition according to claim 1,
applying the mixed polyurethane composition to at least one of the substrate surfaces to be bonded,
fitting the substrates to be bonded together within the open time,
curing the polyurethane composition.

13. The product resulting from the bonding method according to claim 12.

14. A method for filling joints and gaps in a substrate, comprising the steps:
a) mixing the first component and the second component of a polyurethane composition according to claim 1,
b) applying the mixed polyurethane composition in the joint to be covered between two substrates or in the gap to be filled on the surface of a substrate,
c) curing the polyurethane composition in the joint or the gap.

15. The polyurethane composition according to claim 2, wherein the aliphatic or cycloaliphatic diol A2 is selected from the group consisting of 1,3-butanediol, 2,3-butanediol, 2-methyl-1,3-propanediol, 1,2-pentanediol, 2,4-pentanediol, 2-methyl-1,4-butanediol, 2,2-dimethyl-1,3-propanediol, 1,2-hexanediol, 3-methyl-1,5-pentanediol, 1,2-octanediol, 3,6-octanediol, 2-ethyl-1,3-hexanediol, 2,2,4-trimethyl-1,3-pentanediol, 2-butyl-2-ethyl-1,3-propanediol, 2,7-dimethyl-3,6-octandiol, 1,4-cyclohexanediol, 1,3-cyclohexane dimethanol and 1,4-cyclohexane dimethanol.

16. The polyurethane composition according to claim 3, wherein the first component additionally comprises a monoalcohol A4 with a molar mass in the range of 140 to 340 g/mol, wherein the monoalcohol A4 is present in a quantity such that the weight ratio A4/(A1+A2) falls in the range of 0.1 to 0.5.

17. The polyurethane composition according to claim 4, wherein the polyisocyanate is a form of 4,4'-, 2,4'- or 2,2'-diphenylmethane diisocyanate liquid at room temperature and arbitrary mixtures of these isomers (MDI) in the form of polymeric MDI or MDI with fractions of oligomers or derivatives.

18. The polyurethane composition according to claim 5, wherein the second component does not contain a polyurethane polymer with isocyanate groups.

19. The polyurethane composition according to claim 6, wherein the first component contains no polyester polyols.

20. The polyurethane composition according to claim 1,
wherein the weight ratio A1/A2 falls in the range of 0.3 to 0.7,
wherein the weight ratio A3/(A1+A2) falls in the range of 5 to 8, and
wherein the fraction of polybutadiene polyol A3, based on all polyols present in the first component, falls in the range of 75 to 90 wt.-%.

21. The polyurethane composition according to claim 1, wherein the alkoxylated aromatic diol A1 is a propoxylated bisphenol A.

22. The polyurethane composition according to claim 4, wherein the monoalcohol A4 is present in a quantity such that the weight ratio A4/(A1+A2) falls in the range of 0.2 to 0.4.

23. The polyurethane composition according to claim 1, wherein the first component contains
    50 to 80 wt.-% of the total of diol A1, diol A2 and polybutadiene polyol A3, and
    20 to 40 wt.-% fillers,
    and optionally additional constituents.

24. The polyurethane composition according to claim 1, wherein the second component contains 95 to 100 wt.-% of a form liquid at room temperature of 4,4'-, 2,4'- or 2,2'-diphenylmethane diisocyanate and arbitrary mixtures of these isomers (MDI).

25. The polyurethane composition according to claim 1, wherein the mixing ratio in parts by weight between the first and second component falls in the range of 7.5:1 to 2:1.

26. The polyurethane composition according to claim 1, wherein the polyurethane composition consists of the first component and the second component.

27. The polyurethane composition according to claim 1, wherein after the first and second components are mixed, the tensile shear strength at 85° C. of the resulting composition is in a range of 2.1 to 4.2 MPa.

\* \* \* \* \*